US012753723B2

(12) United States Patent
Milliere et al.

(10) Patent No.: US 12,753,723 B2
(45) Date of Patent: Oct. 6, 2026

(54) AIRCRAFT COMPRISING A DIHYDROGEN SUPPLY SYSTEM AND A DIHYDROGEN HEAT TREATMENT SYSTEM

(71) Applicants: Airbus SAS, Blagnac (FR); Airbus Operations SAS, Toulouse (FR)

(72) Inventors: Jérôme Milliere, Toulouse (FR); Olivier Verseux, Toulouse (FR); Jonathan Landolt, Blagnac (FR); Darren Paget, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 197 days.

(21) Appl. No.: 18/883,043

(22) Filed: Sep. 12, 2024

(65) Prior Publication Data

US 2025/0091724 A1 Mar. 20, 2025

(30) Foreign Application Priority Data

Sep. 18, 2023 (FR) .................................. FR2309844

(51) Int. Cl.
*F02C 7/224* (2006.01)
*F02C 7/236* (2006.01)
*F02C 3/22* (2006.01)

(52) U.S. Cl.
CPC .............. *F02C 7/224* (2013.01); *F02C 7/236* (2013.01); *F02C 3/22* (2013.01)

(58) Field of Classification Search
CPC ............. F02C 3/22; F02C 7/224; F02C 7/236
See application file for complete search history.

(56) References Cited

U.S. PATENT DOCUMENTS

| | | | | |
|---|---|---|---|---|
| 11,643,978 B2 * | 5/2023 | Swann | ...................... | F02C 9/00 60/773 |
| 2015/0337730 A1 * | 11/2015 | Kupiszewski | ............ | F02C 7/16 60/39.465 |
| 2022/0235716 A1 * | 7/2022 | Swann | ...................... | F02C 9/28 |

(Continued)

FOREIGN PATENT DOCUMENTS

| | | |
|---|---|---|
| CN | 1259219 C | 6/2006 |
| DE | 102016001343 A1 | 8/2016 |

(Continued)

OTHER PUBLICATIONS

Airbus Deutschland GmbH, "Liquid Hydrogen Fuelled Aircraft—System Analysis (Cryoplane)", Final Technical Report—5th Framework program of the European Communities, Sep. 24, 2003, pp. 1-80. (Year: 2003).*

(Continued)

*Primary Examiner* — Lorne E Meade
(74) *Attorney, Agent, or Firm* — Greer, Burns & Crain, Ltd.

(57) ABSTRACT

An aircraft comprising at least one dihydrogen tank, at least one dihydrogen consumer system, a supply line arranged between a consumer system and a tank, for each consumer system, a loop containing a heat transfer fluid, for each tank and each supply line, a supply heat exchanger which exchanges calories between the heat transfer fluid and the dihydrogen and, for each consumer system, a return heat exchanger which exchanges calories between the heat transfer fluid and the consumer system.

4 Claims, 4 Drawing Sheets

(56) References Cited

U.S. PATENT DOCUMENTS

| | | | |
|---|---|---|---|
| 2023/0132092 | A1 | 4/2023 | Engler et al. |
| 2023/0212982 | A1 | 7/2023 | Jouan |
| 2023/0382537 | A1 | 11/2023 | Prince et al. |

FOREIGN PATENT DOCUMENTS

| | | | |
|---|---|---|---|
| EP | 3048281 | B1 | 4/2017 |
| FR | 3110895 | A1 | 12/2021 |
| WO | 2022074040 | A1 | 4/2022 |

OTHER PUBLICATIONS

French Search Report for corresponding French Patent Application No. 2309844 dated Feb. 13, 2024.

* cited by examiner

Fig. 1
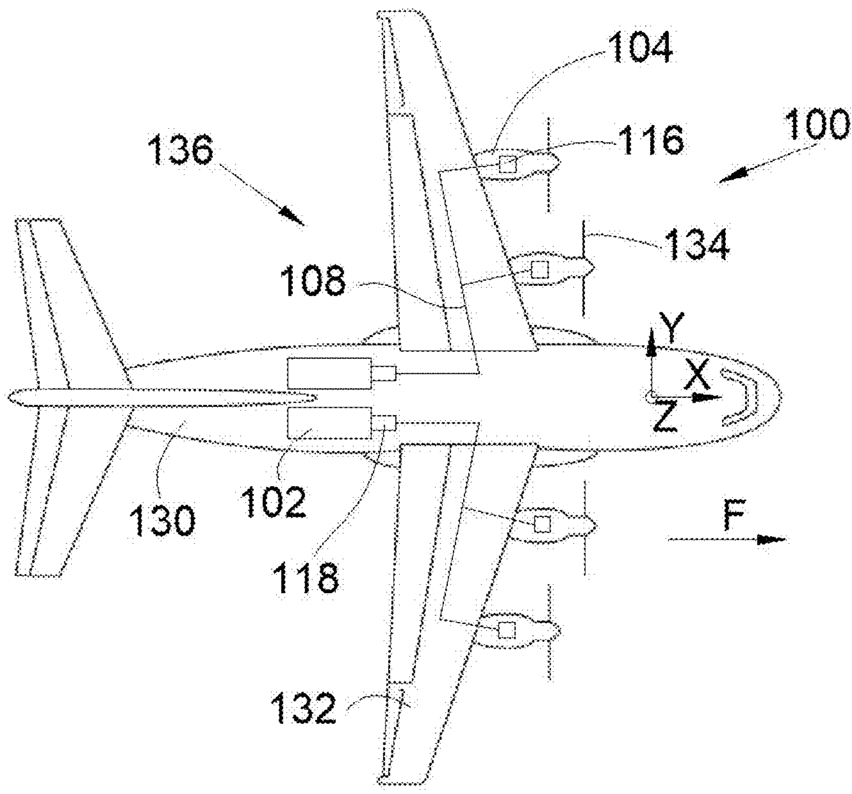
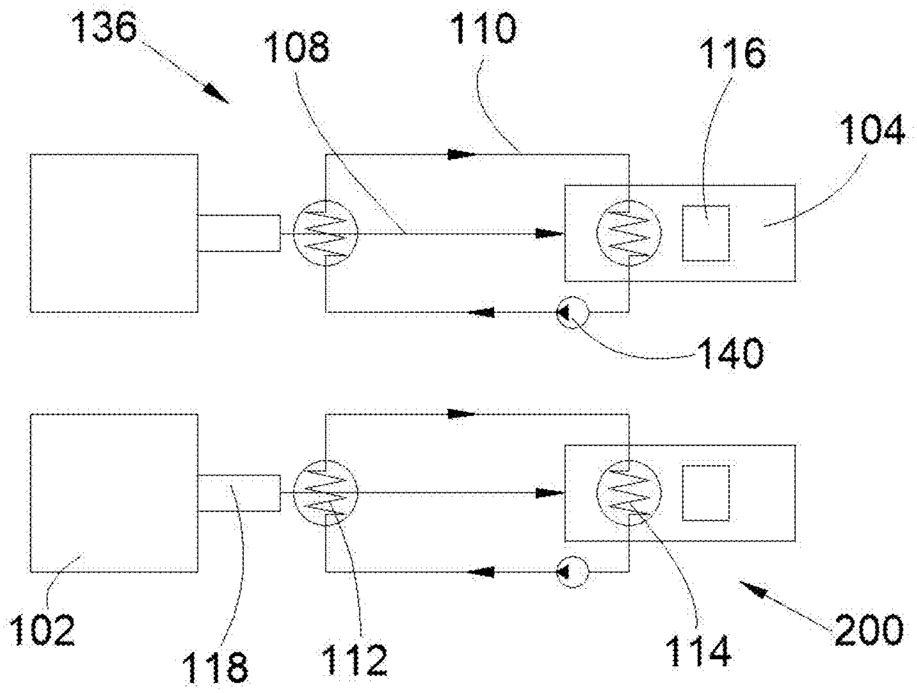
Fig. 2

Fig. 5
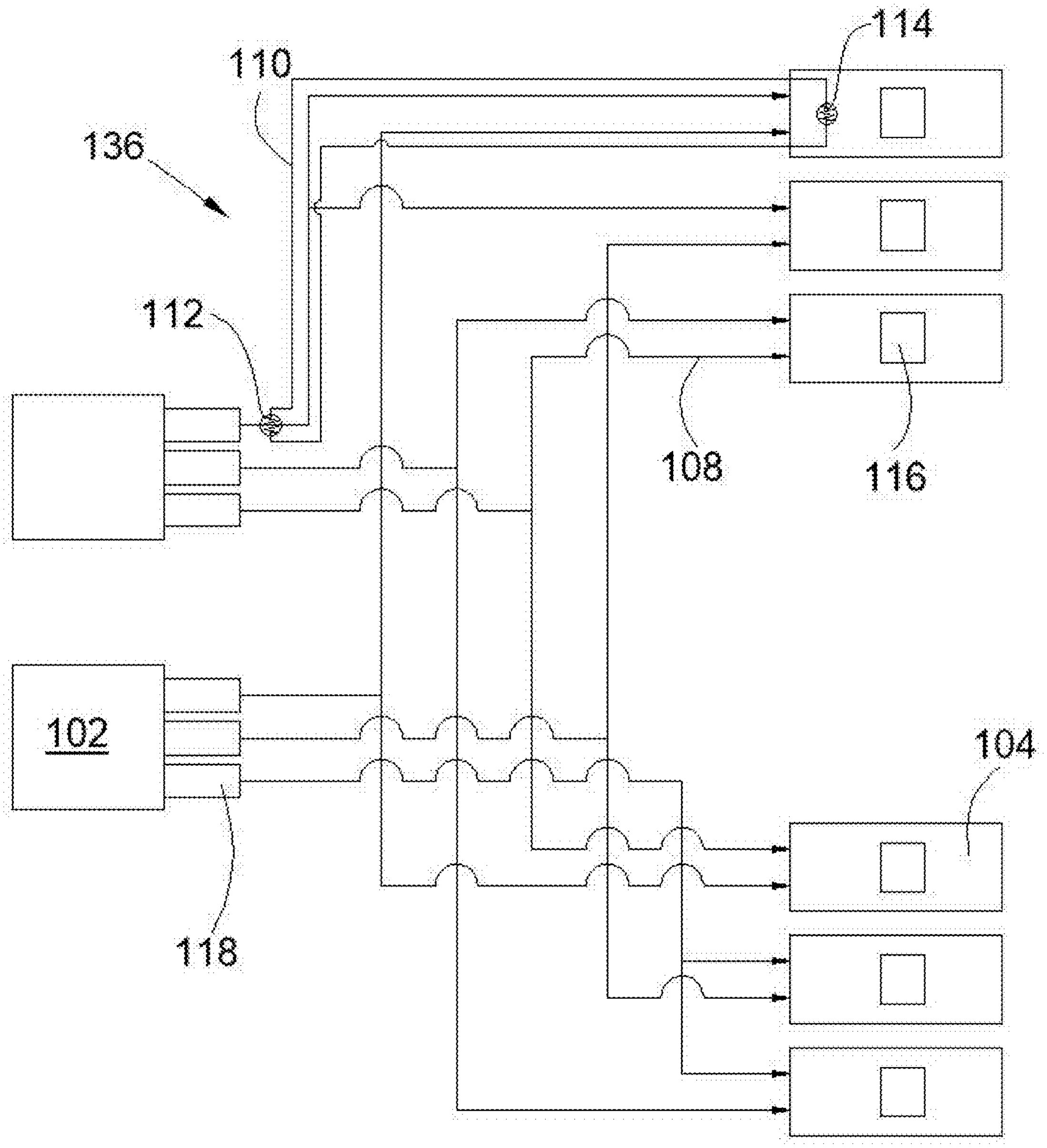
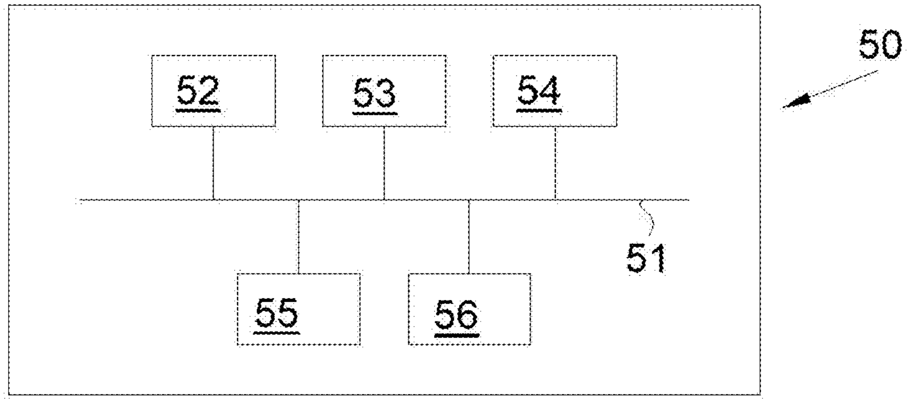
Fig. 6

AIRCRAFT COMPRISING A DIHYDROGEN SUPPLY SYSTEM AND A DIHYDROGEN HEAT TREATMENT SYSTEM

CROSS-REFERENCES TO RELATED APPLICATIONS

This application claims the benefit of French Patent Application Number 2309844 filed on Sep. 18, 2023, the entire disclosure of which is incorporated herein by way of reference.

FIELD OF THE INVENTION

The present invention relates to an aircraft comprising dihydrogen tanks, motorization systems adapted to consume dihydrogen and a dihydrogen supply system and a dihydrogen heat treatment system.

BACKGROUND OF THE INVENTION

In order to move, an aircraft conventionally comprises at least one motorization system such as a turboprop engine. Such a motorization system is generally supplied with kerosene. For ecological reasons, there is now a desire to limit the consumption of kerosene which is replaced by dihydrogen.

The latter is stored in liquid form in a tank of the aircraft and the motorization system comprises a consumer system which consumes the dihydrogen to supply thrust to the aircraft. Such a consumer system is for example a turbojet engine, the combustion chamber of which burns the dihydrogen, or a fuel cell which consumes dihydrogen to generate the electric current powering the electric motor.

To improve the efficiency of the consumer system, it is desirable for the dihydrogen to be consumed in gaseous form.

For this, there are heat installations which ensure the heating-up of the dihydrogen between the tank and the consumer system. Even though such heat installations give satisfaction, they are relatively bulky.

SUMMARY OF THE INVENTION

An object of the present invention is to propose an aircraft comprising dihydrogen tanks, motorization systems adapted to consume dihydrogen and a dihydrogen supply system and a dihydrogen heat treatment system, in which the heat treatment system is relatively less bulky than that of conventional systems.

To this end, an aircraft is proposed comprising:

- at least one tank containing dihydrogen,
- at least one motorization system comprising a dihydrogen consumer system,
- for each consumer system and at least one tank, a supply line arranged between said consumer system and said tank,
- for each motorization system, a loop containing a heat transfer fluid,
- for each tank and each supply line supplied by said tank, a supply heat exchanger arranged so as to exchange calories between the heat transfer fluid circulating in a loop and the dihydrogen circulating in the supply line at the output of the tank, and
- for each consumer system, a return heat exchanger arranged so as to exchange calories between the heat transfer fluid circulating in a loop and the consumer system of the motorization system.

With such an arrangement, the transfer of calories is done between the loop and the dihydrogen, and it is not therefore necessary to install bulky and energy-consuming heating elements.

Advantageously there are two tanks, there are 2*N consumer systems in which N is an integer greater than 1, each tank has N outputs, and the supply lines are arranged such that, on the one hand, each consumer system is supplied by two different outputs, and, on the other hand, two outputs do not supply the same pair of consumer systems.

Advantageously, there are four consumer systems, a first tank has a first and a second output, a second tank has a third and a fourth output, a first consumer system is connected to the first and to the third outputs, a second consumer system is connected to the first and to the second outputs, a third consumer system is connected to the second and to the fourth outputs and a fourth consumer system is connected to the third and to the fourth outputs.

Advantageously, there is a first supply heat exchanger at the first output, a second supply heat exchanger at the second output, a third supply heat exchanger at the third output, a fourth supply heat exchanger at the fourth output, and there is a first loop between the first supply heat exchanger and a first return heat exchanger at the first consumer system, a second loop between the second supply heat exchanger and a second return heat exchanger at the second consumer system, a third loop between the third supply heat exchanger and a third return heat exchanger at the third consumer system, and a fourth loop between the fourth supply heat exchanger and a fourth return heat exchanger at the fourth consumer system.

Advantageously, the aircraft comprises a first diversion line between the run of the first, respectively third, loop in which the heat transfer fluid circulates from the supply heat exchanger to the return heat exchanger and the run of the second, respectively fourth, loop in which the heat transfer fluid circulates from the supply heat exchanger to the return heat exchanger, a second diversion line between the run of the first, respectively third, loop in which the heat transfer fluid circulates from the return heat exchanger to the supply heat exchanger and the run of the second, respectively fourth, loop in which the heat transfer fluid circulates from the return heat exchanger to the supply heat exchanger, each diversion line is equipped with a first shut-off valve and, on either side of the connection between a run and a diversion line, said run is equipped with a second shut-off valve.

BRIEF DESCRIPTION OF THE DRAWINGS

The features of the invention mentioned above, and others, will become more clearly apparent on reading the following description of an exemplary embodiment, said description being given in relation to the attached drawings, in which:

FIG. 1 is a top view of an aircraft according to the invention,

FIG. 2 is a schematic representation of a dihydrogen supply system and of a dihydrogen heat treatment system according to a first embodiment of the invention, FIG. 5 is a schematic representation of a dihydrogen supply system according to a third embodiment of the invention, and FIG. 6 schematically illustrates an example of a control unit implemented in the invention.

DETAILED DESCRIPTION OF THE PREFERRED EMBODIMENTS

Figure 3:
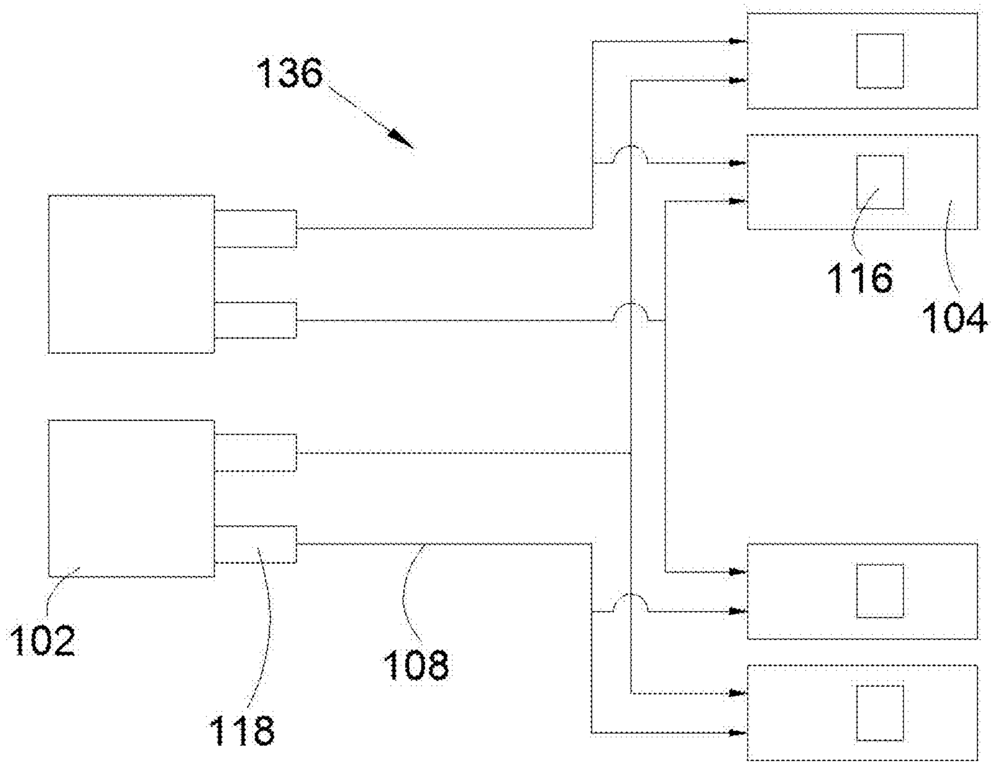
FIG. 3 is a schematic representation of a dihydrogen supply system according to a second embodiment of the invention.

In the following description, the terms relating to a position are taken with reference to an aircraft in position of advance, that is to say as it is represented in FIG. 1 in which the arrow F shows the direction of advance of the aircraft.

In the following description, and by convention, X denotes the longitudinal axis of the aircraft oriented positively forward in the direction of advance of the aircraft, Y denotes the transverse axis which is horizontal when the aircraft is on the ground, and Z denotes the vertical axis or vertical height when the aircraft is on the ground, these three axes X, Y and Z being mutually orthogonal.

FIG. 1 shows an aircraft 100 which has a fuselage 130 on either side of which is fixed a wing 132. Under each wing 132 there is fixed at least one motorization system 104 and each motorization system 104 comprises a consumer system 116 which is provided to consume dihydrogen, in particular in gaseous form. Such a consumer system 116 is for example a combustion engine such as a turbojet engine, the combustion chamber of which burns the dihydrogen, or a fuel cell which consumes dihydrogen to generate electric current powering an electric motor.

In the embodiment of the invention presented in FIG. 1, there are four consumer systems 116, each driving a propeller 134.

The aircraft 100 also comprises at least one tank 102 containing dihydrogen, in particular in liquid form. In the embodiment presented here, there are two tanks 102 and they are disposed in the fuselage 130 and, here, at the rear thereof.

The aircraft 100 also comprises a supply system 136 which comprises supply lines 108 which are arranged to guide the dihydrogen from each tank 102 to a consumer system 116.

Thus, for each consumer system 116 and at least one tank 102, there is a supply line 108 which is arranged between the consumer system 116 and the tank 102. Each tank 102 is equipped with at least one output 118 to which a single supply line is fluidically connected. Each output 118 is for example equipped with a pump which makes it possible to move the dihydrogen in the line 108 connected to said output 118.

In the first embodiment of the invention presented in FIG. 2, there are two tanks 102 and two motorization systems 104 each comprising a consumer system 116. Each tank 102 has an output 118 and each consumer system 116 is, here, supplied by a supply line 108 connected between an output 118 and said consumer system 116. Such an embodiment makes it possible to produce a segregation by physically separating each tank 102 and the motorization system 104 which is connected to it from the other tank 102 and from the other motorization system 104 which is connected to it to avoid the propagation of a problem from one to the other.

In the second embodiment of the invention presented in FIG. 3, there is still a first tank 102 having a first output and a second output 118, a second tank 102 having a third output and a fourth output 118, and there are four consumer systems 116.

In this second embodiment, the first consumer system 116 is connected to the first and to the third outputs 118 by supply lines 108, the second consumer system 116 is connected to the first and to the second outputs 118 by supply lines 108, the third consumer system 116 is connected to the second and to the fourth outputs 118 by supply lines 108 and the fourth consumer system 116 is connected to the third and to the fourth outputs 118 by supply lines 108. With such an arrangement, a problem on one of the outputs 118 does not prevent each consumer system 116 from continuing to be supplied with dihydrogen by at least one tank 102.

In the third embodiment presented in FIG. 5, there is still a first tank 102 having a first, a second and a third output 118, a second tank 102 having a fourth, a fifth and a sixth output 118, and there are six consumer systems 116.

In this third embodiment, the first consumer system 116 is connected to the first and to the fourth outputs 118 by supply lines 108, the second consumer system 116 is connected to the first and to the fifth outputs 118 by supply lines 108, the third consumer system 116 is connected to the second and to the third outputs 118 by supply lines 108, the fourth consumer system 116 is connected to the third and to the fourth outputs 118 by supply lines 108, the fifth consumer system 116 is connected to the sixth and to the fifth outputs 118 by supply lines 108, and the sixth consumer system 116 is connected to the second and to the sixth outputs 118 by supply lines 108. As previously, with such an arrangement, a problem on one of the outputs 118 does not prevent each consumer system 116 from continuing to be supplied with dihydrogen by at least one tank 102.

As a general rule, with respect to the second and third embodiments of the invention, the aircraft 100 comprises two tanks 102 and 2*N consumer systems 116 in which N is an integer strictly greater than one. There is therefore preferentially an even number of consumer systems 116 which are distributed on either side of a vertical median plane of the aircraft 100.

Each tank 102 is equipped with N outputs 118 and each is connected to a supply line 108.

The supply lines 108 are arranged such that, on the one hand, each consumer system 116 is supplied by two different outputs 118, and, on the other hand, such that two outputs 118 do not supply a same pair of consumer systems 116. Thus, a problem on one of the outputs 118 does not prevent each consumer system 116 from continuing to be supplied with dihydrogen by at least one tank 102.

Each tank 102 thus has as many outputs 118 as there are consumer systems 116 on each side of the aircraft 100 and each output 118 supplies two consumer systems 116. In the second embodiment of the invention of FIG. 3, the supply lines 108 are arranged such that the first output 118 of the first tank 102 supplies dihydrogen to two consumer systems 116 on one side of the aircraft 100, the second output 118 of the second tank 102 supplies dihydrogen to two consumer systems 116 on the other side of the aircraft 100, the second output 118 of the first tank 102 and the first output of the second tank 102 supply dihydrogen to two consumer systems 116, one on each side of the aircraft 100.

Figure 4:
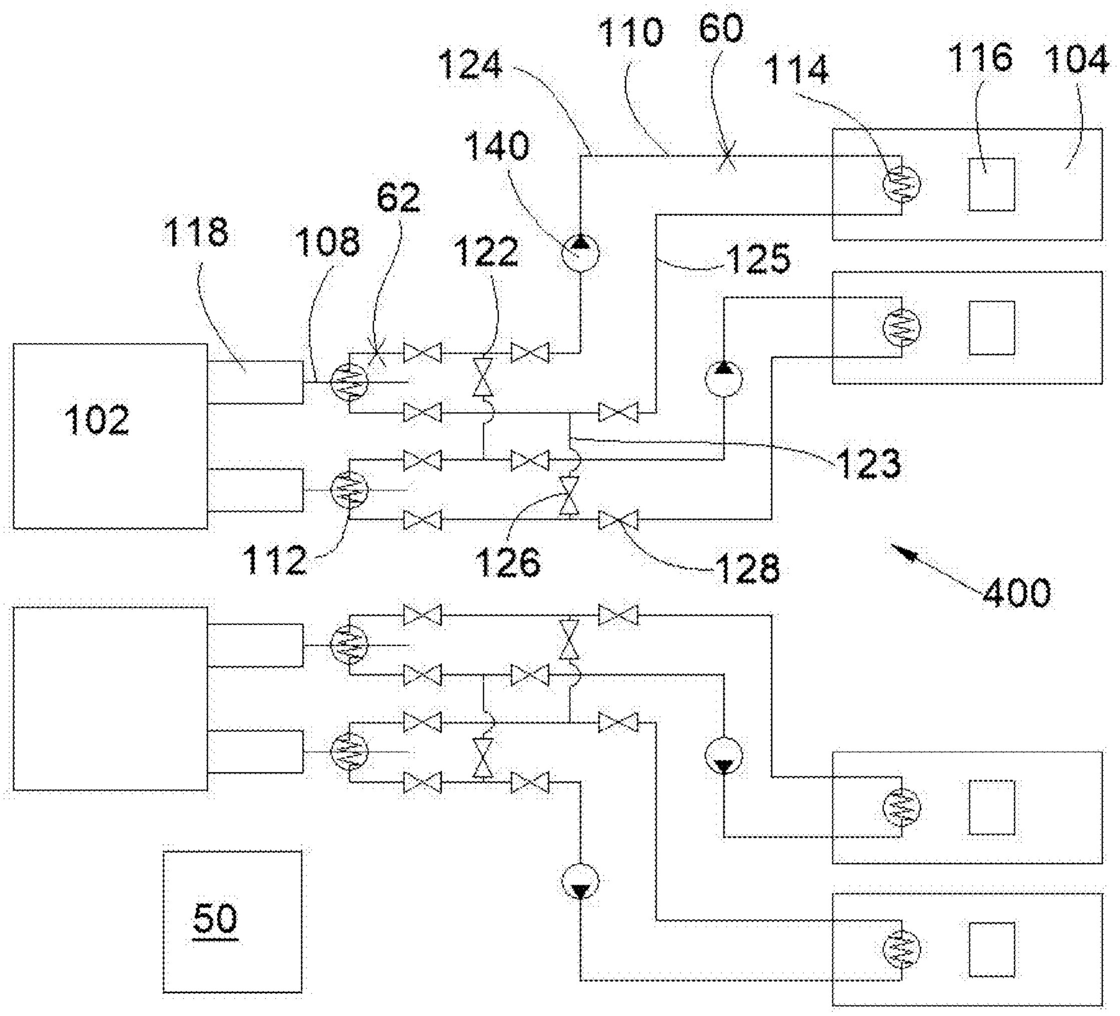
FIG. 4 is a schematic representation of a heat treatment system implemented in the second embodiment of the invention.

To regulate the temperature of the dihydrogen between the tank 102 in which it is stored and the consumer system 116 where it is consumed, the aircraft 100 comprises a heat treatment system 200, 400, embodiments of which are represented in FIGS. 2 and 4.

For each motorization system 104, the heat treatment system 200, 400 comprises a loop 110 containing a heat transfer fluid which circulates in said loop 110 for example via a pump 140 installed on said loop 110.

For each tank 102 and each supply line 108 supplied by said tank 102, that is to say for each output 118, the heat treatment system 200, 400 comprises a supply heat exchanger 112 arranged so as to exchange calories between the heat transfer fluid circulating in a loop 110 and the dihydrogen circulating in the supply line 108 at the output of the tank 102, that is to say at the output 118.

Because of the temperatures, the supply heat exchanger 112 ensures the transfer of calories from the heat transfer fluid to the dihydrogen which is heated up while the heat transfer fluid is cooled down.

For each consumer system 116, the heat treatment system 200, 400 comprises a return heat exchanger 114 arranged so as to exchange calories between the heat transfer fluid circulating in a loop 110 and the consumer system 116 of the motorization system 104, that is to say the fuel cell or the combustion engine.

Because of the temperatures, the return heat exchanger 114 ensures the transfer of calories from the consumer system 116 to the heat transfer fluid which is heated up while the consumer system 116 is cooled down.

The combination of such a supply system 136 and such a heat treatment system 200, 400 ensures, with a simple arrangement, the heating-up of the dihydrogen between the tank 102 and the consumer system 116 to make it change from the liquid phase to the gaseous phase.

In the case of the first embodiment of FIG. 2, the separation of the supply system 136 and of the heat treatment system 200 into two distinct assemblies ensures an independent operation of the two assemblies even in the event of a problem on one of them.

In the second embodiment represented in FIG. 4, the heat treatment system 400 comprises a first supply heat exchanger 112 at the first output 118, a second supply heat exchanger 112 at the second output 118, a third supply heat exchanger 112 at the third output 118 and a fourth supply heat exchanger 112 at the fourth output 118.

There are also four loops 110 and four return heat exchangers 114, that is to say one of each per consumer system 116.

There is thus a first loop 110 between the first supply heat exchanger 112 and the first return heat exchanger 114 at the first consumer system 116, a second loop 110 between the second supply heat exchanger 112 and the second return heat exchanger 114 at the second consumer system 116, a third loop 110 between the third supply heat exchanger 112 and the third return heat exchanger 114 at the third consumer system 116, and a fourth loop 110 between the fourth supply heat exchanger 112 and the fourth return heat exchanger 114 at the fourth consumer system 116.

Each loop 110 thus ensures the heating-up of the dihydrogen between the associated output 118 and consumer system 116.

Each loop 110 comprises a first run 124 in which the heat transfer fluid circulates from the supply heat exchanger 112 to the return heat exchanger 114 and a second run 125 in which the heat transfer fluid circulates from the return heat exchanger 114 to the supply heat exchanger 112.

A pump 140 is disposed on at least one of these runs 124 and 125 to drive the heat transfer fluid in the loop 110.

To ensure the temperature regulation even in the event of an incident on a loop 110, the aircraft 100 comprises a first diversion line 122 between the first run 124 of the first, respectively third, loop 110 and the first run 124 of the second, respectively fourth, loop 110 and a second diversion line 123 between the second run 125 of the first, respectively third, loop 110 and the second run 125 of the second, respectively fourth, loop 110.

Each diversion line 122, 123 is equipped with a first shut-off valve 126 to prevent or free the passage for the heat transfer fluid in said diversion line 122, 123. At the same time, on either side of the connection between a run 124, 125 and a diversion line 122, 123, said run 124, 125 is equipped with a second shut-off valve 128 which makes it possible also to prevent or free the passage for the heat transfer fluid in the run 124, 125 concerned.

In normal operation, the second shut-off valves 128 are open and the first shut-off valves 126 are closed.

Each shut-off valve 126, 128 is preferentially a valve driven electrically, pneumatically, or otherwise, and controlled in opening and in closing by a control unit 50 of the aircraft 100.

The aircraft 100 also comprises a monitoring system which makes it possible to know if an incident is occurring on one or other of the runs 124, 125 and, based on the information delivered by the monitoring system, the control unit 50 manages the shut-off valves 126 and 128 to best supply each loop 110. The monitoring system comprises, for example, pressure sensors which monitor the pressure of the heat transfer fluid in each run 124, 125.

According to a particular mode of operation, if an incident occurs on a loop 110 between a diversion line 122, 123 and a return heat exchanger 114 as symbolized for example by reference no. 60 of FIG. 4, the two second shut-off valves 128 between the incident 60 and each diversion line 122, 123 are then controlled to close by the control unit 50 and the two first shut-off valves 126 are then controlled to open by the control unit 50. The return heat exchanger 114 affected by the incident 60 is then no longer supplied with heat transfer fluid but the supply heat exchanger 112 affected by the incident 60 continues to be supplied with heat transfer fluid by the second loop 110 which guarantees the heating-up of the dihydrogen at the first output 118.

According to a particular mode of operation, if an incident occurs on a loop 110 between a diversion line 122, 123 and a supply heat exchanger 112 as symbolized for example by the reference 62 of FIG. 4, the two second shut-off valves 128 between the incident 62 and each diversion line 122, 123 are then controlled to close by the control unit 50 to isolate the incident 62, but there is no provision to open the first shut-off valves 126 to limit the risks of contamination by dihydrogen of the two loops 110.

In the third embodiment represented in FIG. 5, an example of a heat treatment system comprises, as for the second embodiment, a supply heat exchanger 112 at each output 118, a return heat exchanger 114 at each consumer system 116 and a loop 110 between the two heat exchangers 112 and 114. There are thus a first loop between the first output 118 and the first consumer system 116, a second loop between the second output 118 and the second consumer system 116, and so on up to a sixth loop. For the purposes of clarity, only the first loop 110 has been represented in FIG. 5.

FIG. 6 shows an embodiment of the control unit 50 which comprises, linked by a communication bus 51: a processor or CPU 52 (Central Processing Unit); a Random Access Memory RAM 53; a Read Only Memory ROM 54; a storage unit 55 such as a hard disk or a storage media reader, such as an SD (Secure Digital) card reader; at least one communication interface 56, for example allowing the control unit to communicate with the sensors, the shut-off valves, etc.

The processor is capable of executing instructions loaded into the RAM from the ROM, from an external memory (not represented), from a storage medium (such as an SD card), or from a communication network. When the equipment is powered up, the processor is capable of reading instructions from the RAM and of executing them. These instructions form a computer program causing the implementation, by the processor, of all or part of the algorithms and steps described.

All or part of the algorithms and steps described below can be implemented in software form by the execution of a set of instructions by a programmable machine, for example a DSP (Digital Signal Processor) or a microcontroller, or be implemented in hardware form by a dedicated machine or component, for example an FPGA (Field-Programmable Gate Array) or an ASIC (Application-Specific Integrated Circuit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

at least one tank containing dihydrogen, at least one motorization system comprising a dihydrogen consumer system, for each dihydrogen consumer system and said at least one tank, a supply line arranged between said dihydrogen consumer system and said at least one tank, for each motorization system, a loop containing a heat transfer fluid, for each tank and each supply line supplied by said tank, a supply heat exchanger configured to exchange calories between the heat transfer fluid circulating in said loop and the dihydrogen circulating in the supply line at an output of said tank, and for each dihydrogen consumer system, a return heat exchanger configured to exchange calories between the heat transfer fluid circulating in said loop and the dihydrogen consumer system of the at least one motorization system, wherein there are two tanks, there are 2*N dihydrogen consumer systems in which N is an integer greater than 1, each one of the two tanks has N outputs, and the supply lines are arranged such that each one of the dihydrogen consumer system is supplied by different outputs of each one of the two tanks and said different outputs do not supply a same pair of dihydrogen consumer systems.

2. The aircraft as claimed in claim 1, wherein there are four dihydrogen consumer systems, a first tank has a first output and a second output, a second tank has a third output and a fourth output, a first dihydrogen consumer system is connected to the first output and to the third output, a second dihydrogen consumer system is connected to the first output and to the second output, a third dihydrogen consumer system is connected to the second output and to the fourth output, and a fourth dihydrogen consumer system is connected to the third output and to the fourth output.

3. The aircraft as claimed in claim 2, further comprising:

a first supply heat exchanger at the first output, a second supply heat exchanger at the second output, a third supply heat exchanger at the third output, a fourth supply heat exchanger at the fourth output, a first loop between the first supply heat exchanger and a first return heat exchanger at the first dihydrogen consumer system, a second loop between the second supply heat exchanger and a second return heat exchanger at the second dihydrogen consumer system, a third loop between the third supply heat exchanger and a third return heat exchanger at the third dihydrogen consumer system, and a fourth loop between the fourth supply heat exchanger and a fourth return heat exchanger at the fourth dihydrogen consumer system.

4. The aircraft as claimed in claim 3, further comprising:

a first diversion line between a first run of the first loop in which the heat transfer fluid circulates from the first supply heat exchanger to the first return heat exchanger and a third run of the second loop in which the heat transfer fluid circulates from the second supply heat exchanger to the second return heat exchanger, a second diversion line between a second run of the first loop in which the heat transfer fluid circulates from the first return heat exchanger to the first supply heat exchanger and a fourth run of the second loop in which the heat transfer fluid circulates from the second return heat exchanger to the second supply heat exchanger, said first diversion line is equipped with a first shut-off valve and, on either side of a connection between said first run and said first diversion line, said first run is equipped with second shut-off valves, and said second diversion line is equipped with a third shut-off valve and, on either side of a connection between said second run and said second diversion line, said second run is equipped with fourth shut-off valves.

* * * * *